US012559969B2

(12) United States Patent
Malkoc

(10) Patent No.: US 12,559,969 B2
(45) Date of Patent: Feb. 24, 2026

(54) LOCKING SYSTEM

(71) Applicant: EMKA BESCHLAGTEILE GMBH & CO. KG, Velbert (DE)

(72) Inventor: Murat Malkoc, Bochum (DE)

(73) Assignee: EMKA BESCHLAGTEILE GMBH & CO. KG, Velbert (DE)

( * ) Notice: Subject to any disclaimer, the term of this patent is extended or adjusted under 35 U.S.C. 154(b) by 189 days.

(21) Appl. No.: 18/016,917

(22) PCT Filed: Jul. 27, 2021

(86) PCT No.: PCT/DE2021/100645
§ 371 (c)(1),
(2) Date: Jan. 19, 2023

(87) PCT Pub. No.: WO2022/022779
PCT Pub. Date: Feb. 3, 2022

(65) Prior Publication Data

US 2023/0295954 A1 Sep. 21, 2023

(30) Foreign Application Priority Data

Jul. 29, 2020 (DE) ..................... 10 2020 120 000.5

(51) Int. Cl.
*E05B 13/10* (2006.01)
*E05B 1/00* (2006.01)
(Continued)

(52) U.S. Cl.
CPC ............ *E05B 13/10* (2013.01); *E05B 1/0092* (2013.01); *E05B 41/00* (2013.01); *E05B 63/0056* (2013.01); *E05B 63/06* (2013.01)

(58) Field of Classification Search
CPC .... E05B 1/0092; E05B 41/00; E05B 63/0056; E05B 63/06; E05B 2015/107;
(Continued)

(56) References Cited

U.S. PATENT DOCUMENTS 3,843,173 A * 10/1974 Harrell ...................... E05B 9/08 292/7
4,706,478 A * 11/1987 Swan .................... E05B 13/004 70/210
(Continued)

FOREIGN PATENT DOCUMENTS

DE 29504508 U1 7/1996
DE 202014101593 U1 6/2014
(Continued)

OTHER PUBLICATIONS

PCT) European Patent Office (ISA/EP), International Search Report (with partial English translation), International Application No. PCT/DE2021/100645, 5 pages, Nov. 3, 2021.
(Continued)

*Primary Examiner* — Steven A Tullia
(74) *Attorney, Agent, or Firm* — Thompson Hine LLP

(57) ABSTRACT

A locking system for locking a closure element, more particularly a door, having a main body, which rotatably receives an actuation element, for arrangement on one side of the closure element and having a locking module for arrangement on the opposite side of the closure element. The actuation element has an interface for connection to the locking module. The main body has a fixed interface for connection to the locking module; and depending on the type of locking module, same can only be connected to the co-rotating interface or to both interfaces. The disclosure also relates to a closure element having such a locking system, and a method for assembling a locking system.

17 Claims, 6 Drawing Sheets

(51) Int. Cl.
*E05B 41/00* (2006.01)
*E05B 63/00* (2006.01)
*E05B 63/06* (2006.01)

(58) Field of Classification Search
CPC . E05B 13/10; E05C 3/24; E05C 3/042; E05C 3/00; E05C 3/004; E05C 9/043
USPC .............................................................. 70/91
See application file for complete search history.

(56) References Cited

U.S. PATENT DOCUMENTS

| | | | | |
|---|---|---|---|---|
| 4,898,408 A * | 2/1990 | Hauber | E05B 63/0069 | 292/DIG. 31 |
| 4,951,486 A * | 8/1990 | Braun | E05C 9/046 | 292/DIG. 31 |
| 5,058,937 A * | 10/1991 | Miehe | E05C 1/145 | 292/DIG. 31 |
| 5,526,660 A * | 6/1996 | Bennett | E05B 13/004 | 70/210 |
| 5,941,104 A * | 8/1999 | Sadler | E05B 85/14 | 292/216 |
| 6,454,321 B1 * | 9/2002 | Parikh | E05C 3/24 | 292/216 |
| 6,530,250 B1 * | 3/2003 | Linares | E05B 13/004 | 292/DIG. 31 |
| 6,532,778 B2 * | 3/2003 | Molzer | E05B 13/002 | 292/DIG. 31 |
| 6,623,052 B2 * | 9/2003 | Hansen | E05B 1/0092 | 292/DIG. 60 |
| 6,651,467 B1 * | 11/2003 | Weinerman | E05B 5/00 | 292/216 |
| 6,952,940 B2 * | 10/2005 | Molzer | E05B 13/002 | 70/210 |
| 7,398,664 B1 * | 7/2008 | Weinerman | E05C 3/042 | 292/DIG. 31 |
| 7,452,010 B2 * | 11/2008 | Cotton | E05C 5/02 | 292/DIG. 31 |
| 7,454,933 B1 * | 11/2008 | Paige | E05B 5/003 | 292/DIG. 31 |
| 7,611,173 B2 * | 11/2009 | Helton | E05B 13/002 | 292/216 |
| 7,748,246 B1 * | 7/2010 | Paige | E05B 17/0025 | 292/DIG. 31 |
| 7,752,877 B2 * | 7/2010 | Burns | E05B 5/00 | 292/DIG. 31 |
| 8,052,182 B1 * | 11/2011 | Weinerman | E05B 13/004 | 292/336.3 |
| 9,611,678 B2 * | 4/2017 | Weinerman | E05B 13/005 | |
| 9,739,074 B1 * | 8/2017 | Lane | E05B 83/02 | |
| D913,075 S * | 3/2021 | Mihm | D8/302 | |
| 2005/0257582 A1 * | 11/2005 | Minix | E05B 13/004 | 70/210 |
| 2011/0304161 A1 * | 12/2011 | Behjat | E05B 1/0092 | 292/197 |
| 2012/0000256 A1 * | 1/2012 | Stuckey | E05C 3/042 | 70/91 |

FOREIGN PATENT DOCUMENTS

| | | | | |
|---|---|---|---|---|
| DE | 202016104019 U1 | 9/2016 | | |
| DE | 102018102286 A1 | 8/2019 | | |
| EP | 2963208 A1 | 1/2016 | | |
| ES | 2731951 T3 * | 11/2019 | E05B 1/0092 | |
| GB | 2432881 A * | 6/2007 | E05B 15/10 | |

OTHER PUBLICATIONS (PCT) European Patent Office, International Preliminary Report on Patentability issued Jan. 31, 2023 which pertains to PCT Application No. PCT/DE2021/100645 filed Jul. 27, 2021. 7 pages.

* cited by examiner

LOCKING SYSTEM

This application is a national stage filing of International (PCT) Application No. PCT/DE2021/100645, corresponding to International Publication No. WO 2022/022779 filed on Jul. 27, 2021, which in turn claims priority to German Application No. 10 2020 120 000.5 filed on Jul. 29, 2020. The entire contents of both of those applications are hereby incorporated by reference.

The disclosure relates to a locking system for locking a closure element, in particular a door, having a main body, which accommodates an actuating element in a rotatable manner and is intended to be arranged on one side of the closure element, and a locking module, which is intended to be arranged on the opposite side of the closure element, wherein the actuating element has an interface for connection to the locking module. Furthermore, the disclosure relates to a closure element having a locking system, and to a method for installing a locking system.

BACKGROUND

Such locking systems may be used in entirely different regions in technology in order, for example, to lock doors, flaps, hatches, windows or similar closure elements. The corresponding locking systems consist essentially of a main body, an actuating element and of one or more locking modules.

The main body is arranged as a rule on the outer side of the closure element and serves for the rotatable accommodating or mounting of the actuating element. The actuating element extends from the outer side of the closure element through the closure element as far as the inner side of the closure element where it is connected to the locking module. The actuating element can be rotated as a rule by hand from the outer side of the door and, by means of the connection of the actuating element to the locking module, the latter can then be moved to and from between a locking position, in which the closure element cannot be opened and is secured in relation to the frame of the closure element, and an unlocking position, in which the closure element can be opened and is not secured in relation to the frame.

In order to connect actuating element and locking module, the actuating element generally has an interface which is rotatable together with the actuating element and permits a releasable connection between actuating element and locking module. Various locking modules can therefore be arranged on the actuating element via the interface. For example, the locking modules can be casement-lock tongues of various sizes and/or with various degrees of compression, which can be connected to the actuating element via the interface depending on requirements.

Although such a closure system is distinguished by a certain degree of variability because of the possibility of using different locking modules, it is restricted to locking modules which only require connection to the actuating element. In this respect, the complexity of the locking modules is limited.

SUMMARY

Taking this as the starting point, the disclosure can present a closure system which is distinguished by an increased degree of variability.

Certain advantages may be achieved in the case of a closure system of the type mentioned at the beginning in that the main body has a fixed interface for connection to the locking module, wherein, in dependence on the type of locking module, the latter can optionally be connected just to the interface, which rotates along with the actuating element, or to both interfaces.

The additional fixed interface on the main body creates a further attachment point for the locking module, and therefore even locking modules which, in addition to the rotatable interface, additionally require a fixed interface can be used. To this extent, the range of usable locking modules is expanded to locking modules of different types, and the degree of variability of the closure system as a whole is increased.

With regard to the locking module, it is proposed that a first type of locking module and a second type of locking module are provided, wherein the first type of locking module is a casement-lock module and the second type of locking module is a latch-lock module. The casement-lock module may require only a rotatable interface and to this extent only a connection to the actuating element, whereas the latch-lock module, in addition to the rotatable interface, also requires a fixed interface. The various types differ to this extent by the attachment to the actuating element and/or to the main body. Locking modules which can be attached via the same interface or the same interfaces are accordingly locking modules of the same type.

In a development of the modules, it may be advantageous if the casement-lock module can be connected just to the interface, which rotates along with the actuating element, and the latch-lock module can be connected both to the interface, which rotates along with the actuating element, and to the fixed interface. The latch-lock module can to this extent have a more complex design than the casement-lock module since, in addition to the actuating element, the latch-lock module can additionally also still be attached to the main body and to this extent can have not only rotatable components, but also fixed components.

Furthermore, it is proposed that, in dependence on the type of locking module, the fixed interface is used or remains unused. If the locking module requires only the rotating interface, the fixed interface can remain unused and therefore free. In the event of retrofitting or changing the locking module, in particular from a casement-lock module to a latch-lock module, the fixed interface may, however, then also be used for the attachment.

With regard to the configuration of the interfaces, it may be advantageous if they permit a releasable connection. The locking module can therefore be connected releasably via the interface, which rotates along with the actuating element, to the actuating element and releasably via the fixed interface to the main body. The releasable connection permits simple installation and also simple removal and, as a result, simple changing of a locking module. The locking modules can be connectable to the interfaces via connecting elements, in particular screws. The connecting elements to this extent can have threads such that they can be screwed into the interfaces.

It furthermore may be advantageous if the interfaces are configured in the form of mechanical interfaces. Mechanical interfaces permit force to be transmitted between the locking module and the actuating element or between the locking module and the main body and to this extent permit a fixed connection of the elements.

In respect of the fixed interface, it is proposed that the latter has a plurality of, in particular four, points of connection. The plurality of points of connection make it possible to reliably fasten the locking module to the main body since the forces that are to be transmitted can be distributed between a plurality of points of connection. It is possible that, for the connection, all the available points of connection of the interface are used, but it is nevertheless also possible for fewer points of connection to be used and for some points of connection to remain unused. Whether all or only some points of connection are used may depend on the configuration of the respective locking module. The points of connection can lie opposite one another with respect to the actuating element or the actuating axis. In the case of four points of connection, they could lie opposite one another in pairs.

Furthermore, it may be advantageous in respect of the configuration of the fixed interface if the points of connection of the main body are configured in the form of domes, in particular in the form of screw-in domes. This permits a simple connection to the respective locking module and a secure support of the connecting elements. The connecting elements can be screwable into the domes. The domes can have an internal thread. Alternatively, the connecting elements can also be configured as self-tapping screws.

In respect of the configuration of the locking module, it may be advantageous if the casement-lock module has a locking element configured in the form of a casement-lock tongue. The casement-lock tongue can furthermore be configured in the form of a roller tongue or of a hook tongue. A roller tongue reduces the force required during the closing of the closure element and, in addition, also permits a certain contact pressure of the closure element. A hook tongue can permit reliable locking and to this extent can hook into correspondingly configured elements on the closure element frame.

Furthermore, it may be advantageous in respect of the casement-lock tongue if the latter is height-adjustable. By means of a height adjustment, the locking element or the casement-lock tongue can be moved in a direction parallel to the actuating axis, which permits adaptation to the geometry of the closure element and/or the closure element frame. Furthermore, by means of the corresponding height adjustment, the contact pressure of the locking element can also be adjusted. In a structural respect, the locking module can have a guide in which the casement-lock tongue can be movably mounted. The locking element can be connected releasably to the guide, for example, via a screw and can therefore be very simply adjusted in height.

Furthermore, it may be advantageous if the casement-lock tongue is rotationally coupled to the actuating element. Rotation of the actuating element therefore enables the casement-lock tongue to be moved to and from between a locking position and an unlocking position. The casement-lock tongue can to this extent be coupled directly to the actuating element. During the movement of the actuating element about the actuating axis, the casement-lock tongue can also rotate about the actuating axis. If the actuating element is rotated, for example, by 90 degrees, the casement-lock tongue can correspondingly also be rotated by 90 degrees. In practice, a 90 degree rotation is often sufficient to achieve reliable locking and unlocking.

According to a further refinement, it is provided that the casement-lock tongue is connected to the actuating element via a rod drive. The rod drive can have a plurality of rods, and therefore via a single actuating element a plurality of casement-lock tongues can be actuated, i.e. rotated to and from between the locking position and the unlocking position. The locking system can to this extent also permit multi-point locking. The rod drive can have an, in particular plate-like, coupling element which can be connected or rotationally coupled to the actuating element via the interface. During a rotational movement of the actuating element, the coupling element can then be correspondingly moved along with it and likewise rotated about the actuating axis. The rods of the rod drive can be arranged on the coupling element or can be connected thereto. The attachment points of the rods to the coupling element can lie opposite one another with respect to the attachment point to the actuating element. The rotational movement of the actuating element or of the coupling element therefore leads to a substantially linear movement of the rods which can then be used in turn for actuating casement-lock tongues coupled to the rods.

With regard to the latch-lock module, it is proposed that the latter has a frame, which is connected to the fixed interface, and a locking element, which is arranged in a movable manner in relation to the frame. The latch-lock module can to this extent have a more complex configuration than the casement-lock module and, because of the frame, may also require a fixed interface in addition to the rotatable interface. The locking element can be connected to the rotatable interface or to the actuating element and can be movable to and from between a locking position and an unlocking position. The frame can be designed to be fixed in relation to the locking element and can act as a bearing for the locking element.

In a development of the frame, it is proposed that the latter has two frame plates, between which the locking element is pivotably accommodated. The two frame plates can each have two frame limbs which can be arranged at an angle of 90 degrees to one another. One of the frame limbs can be configured as a fastening limb and provided for connection to the fixed interface. The other frame limb can be designed as a bearing limb for the mounting of the locking element. The two bearing limbs of the frame plates can lie one above the other, and therefore they can be connected to the points of connection of the fixed interface via connecting elements, in particular screws. For this purpose, the connecting elements can extend through both frame plates or through both bearing limbs. In this respect, the frame plates can be connectable to the main body in a form-fitting manner. The bearing limbs of the two frame plates or the bearing limbs can be at a distance from one another, which distance can essentially correspond to the thickness of the locking element. The locking element can therefore be accommodated pivotably between the two bearing limbs.

With regard to the configuration of the locking element, it may be advantageous if the latter is configured as a rotary latch. A rotary latch permits reliable securing of a bolt in the frame, and therefore the closure element can be reliably held in the locked position. The rotary latch has a mouth-like or U-shaped receiving contour in which a bolt can be accommodated. The bolt can be configured in the form of a pin. In this respect, it is furthermore proposed that the locking element engages in a form-fitting manner around the bolt, at least in sections, in a locking position. The bolt can be arranged on the closure element frame and can therefore be fixed such that, when the bolt is accommodated in the locking element or in the rotary latch, the closure element is secured in relation to the closure element frame. In contrast to the casement-lock module, the locking element of the latch-lock module alone therefore cannot bring about locking of the closure element; instead, a corresponding bolt is required on the closure element frame. In a structural respect, the frame can have a locking groove into which the bolt can be introduced and in which the bolt can be held in a form-fitting manner by means of the locking element. The locking groove can extend through the two frame plates parallel to the actuating axis and can have a U-shaped contour.

Furthermore, it may be advantageous with regard to the locking element if the latter is pretensioned into the unlocking position. In order to pretension the locking element, a spring element, for example, can be provided which is supported on the frame. The spring element can be configured as a torsion spring or as a spiral spring. When the closure element is closed, the bolt can be moved into the locking element and also into the locking groove of the frame and can rotate the locking element in the process into the locking position counter to the force of the spring element. The locking element can be rotatable perpendicularly to the actuating direction of the actuating element.

Furthermore, it may be advantageous if the locking element is secured in the locking position via an arresting pin. The locking element can be secured in the locking position via the arresting pin in such a manner that it cannot move back again into the unlocking position and also cannot automatically release the bolt again. The arresting pin can to this extent result in a type of self-locking when the locking element has been moved by means of the bolt into the locking position. If the locking element has reached the locking position, the arresting pin can automatically secure the locking element. To this extent, the arresting pin can also be correspondingly pretensioned. In the locking position, a back rotation might not be possible because of the spring tensioning.

Furthermore, it is proposed with regard to the latch-lock module that the latter has a driver, which is coupled to the actuating element and is intended for unlocking the locking element. The driver can be connected via the interface, which rotates along with the actuating element, to the actuating element and can therefore be rotatable together with the actuating element about the actuating axis. During rotation of the actuating element, the driver can come into contact with the arresting pin, can move the latter and can therefore lead to unlocking of the locking element. This is because when the arresting pin no longer secures the locking element, the latter snaps up because of the spring tensioning and the bolt is released. In the case of the latch-lock module, the actuating element, in contrast to the casement-lock module, can therefore be coupled only indirectly to the locking element. The driver can extend perpendicularly to the actuating axis. The driver can furthermore be connected to the actuating element via a union sleeve, and therefore the driver itself does not have to be arranged at the end of the actuating shaft. The union sleeve can be cylindrical or pot-shaped and placed onto the actuating element. The driver can be arranged in the lateral surface region of the union sleeve.

Furthermore, it is proposed, in a first angle range, that the actuating element can be rotated freely together with the driver and, in a second angle range, the arresting pin can be moved via the driver. The actuating element can to this extent be freely rotated until the driver comes into contact with the arresting pin, and a continuing rotational movement of the actuating element then leads to the arresting pin being moved. During a movement in the second angle range, the driver can carry along the arresting pin in order to unlock the locking element.

A further aspect makes provision that the actuating element has an actuating shaft, which extends through the main body, wherein the interface is arranged at the end of the actuating shaft. The corresponding locking module or the locking element or the driver can be screwable onto the actuating shaft via the interface arranged at the end of the actuating shaft. The interface can be configured as a screw-in opening with a thread, and therefore the respective module can be screwed to the actuating shaft via the interface. The actuating shaft can extend through the main body and to this extent can reach from the outer side of the closure element as far as the inner side of the closure element. The locking module arranged on the inner side of the main body can therefore be movable or actuable from the outer side.

In a development of the actuating element, it is proposed that the latter has a grip region, which is connected movably to the actuating shaft. The actuating shaft can be rotated by hand via the grip region. The grip region can have a T-shaped design, which enables good handleability. The grip region can be arranged at the opposite end to the interface of the actuating shaft, and the grip region can be connected to the actuating shaft in the manner of a hinge. The grip region can therefore be pivoted in relation to the actuating shaft, in particular about a pivot axis arranged perpendicularly to the actuating axis.

In this connection, it may be advantageous if the grip region can be pivoted out of the main body and pivoted into the main body. In the pivoted-out position, the actuating element can be rotatable and, in the pivoted-in position, it is not rotatable. The main body can be configured in the manner of a recess which engages around the grip region in the pivoted-in position. The main body can therefore engage at least laterally around the grip region in the pivoted-in position. The main body can furthermore have a recessed grip which simplifies the pivoting of the grip region out of the main body. This is because the grip region can partially protrude in relation to the recessed grip, and therefore it is possible to reach into the recessed grip and therefore behind the grip region and pivot the latter out of the main body.

Furthermore, it can be provided that the grip region is pretensioned into the pivoted-out position. This permits simplified handleability since it is not first required, for actuation purposes, to pivot the grip region out of the main body. Optionally, because of the pretensioning of the grip region, the recessed grip in the main body can also be dispensed with.

In a development, it is proposed that the grip region is secured in the pivoted-in position via a securing device such that the grip region cannot be transferred into the pivoted-out position. The securing device can be arranged in the grip region and can engage in the main body in such a manner that the grip region cannot be pivoted out of the latter. The securing device can have a closing cylinder which can be actuated via a key or else via a tool. In this respect, it may be required to first of all release the securing device with a key or a tool before the grip region can then be pivoted out of the main body and the locking module for unlocking the closure element can then be actuated. According to a development, it is also possible for the closing cylinder to be able to be covered with a cap in order to prevent an ingress of dirt into the closing cylinder. Before the securing device can be released, this cap first of all has to be removed.

Furthermore, it may be advantageous if a catch hook is provided for holding the grip region in the pivoted-in position. The catch hook can be part of the main body and can be movable counter to the force of a spring. If the grip region is pivoted into the main body, the grip region can move the catch hook counter to the spring force. If the grip region has reached its pivoted-in position, the catch hook can move back because of the spring force, can hook into or behind the grip region and can thus firmly hold the latter.

Furthermore, it is also possible for the catch hook to be moved during the pivoting-in of the securing device counter to the spring force. The grip region can therefore be pivoted in even when a securing device is secured or closed. The catch hook can to this extent permit a push-to-lock function, and therefore the grip region simply has only to be pressed shut and is then automatically secured. The catch hook can be mounted from the outer side of the main body, and therefore the inner side or the rear side of the main body does not have to have any corresponding installation apertures. This may be advantageous in respect of the tightness of the main body in relation to the closure element. In particular in the region into which the grip region can be pivoted, the main body can therefore have a closed rear side.

A further development makes provision that the main body has an indicator surface, which is visible when the grip region has been pivoted out and is not visible when the grip region has been pivoted in. The indicator surface makes it already possible from some distance to identify whether the grip region has pivoted into the main body and to this extent is not rotatable, or whether the grip region has been pivoted out of the main body. Since, in the pivoted-in state, a rotational movement of the actuating element is not possible, the indicator surface to this extent makes it possible to identify at first glance whether the actuating element is or is not able to be actuated. Since the securing device secures the grip region in the pivoted-in position, it is also possible to determine in this respect the extent to which an unauthorized actuation of the actuating element is possible. The indicator surface can have a signal color which differs from the color of the grip region and of the main body. In practice, it may be advantageous if the signal surface is red.

Furthermore, the grip region can be pretensioned into the pivoted-out position, in particular via a spring. If, to this extent, the securing device is released, the grip region can automatically spring open because of the spring force, and therefore even the indicator surface is then immediately visible after the release. If the grip region is folded in or pivoted in again, it is moved counter to the force of the spring, and therefore the spring is tensioned by means of this movement.

With regard to the locking system, it is furthermore proposed that the latter has a plurality of locking modules of different types, which are optionally usable. Such a set consisting of a main body, an actuating element and a plurality of locking modules, which are connectable via the interface to the actuating element and, in addition, also to the main body, depending on the type of locking module, provides a large use range, and one locking module can be selected from a group of a plurality of locking modules, depending on requirements. To this extent, it may be advantageous if the group of locking modules contains locking modules of different types. Various locking modules of one type, for example a casement-lock module with a hook tongue and a casement-lock module with a roller tongue, can also be provided.

Furthermore a closure element, in particular a door, having a locking element is proposed, wherein the locking element is configured in the manner already described. To this extent, the advantages already described with regard to the locking system also arise.

Furthermore, a method for installing a locking system for locking a closure element, in particular a door, is proposed, wherein the locking system has a main body, which accommodates an actuating element in a rotatable manner and is intended to be arranged on one side of the closure element, and a locking module, which is intended to be arranged on the opposite side of the closure element, wherein the actuating element has an interface for connection to the locking module, wherein the main body has a fixed interface for connection to the locking module and wherein, in dependence on the type of locking module, the latter is optionally connected just to the interface, which rotates along with the actuating element, or to both interfaces. The advantages already described with regard to the locking system may arise.

Furthermore, to this extent, a method for locking a closure element, in particular a door, is also proposed, wherein the method is carried out with a locking system which is configured in the manner described above.

Further advantages and details of the invention will be explained in more detail below with reference to the attached schematic drawings, in which.

Figure 2:
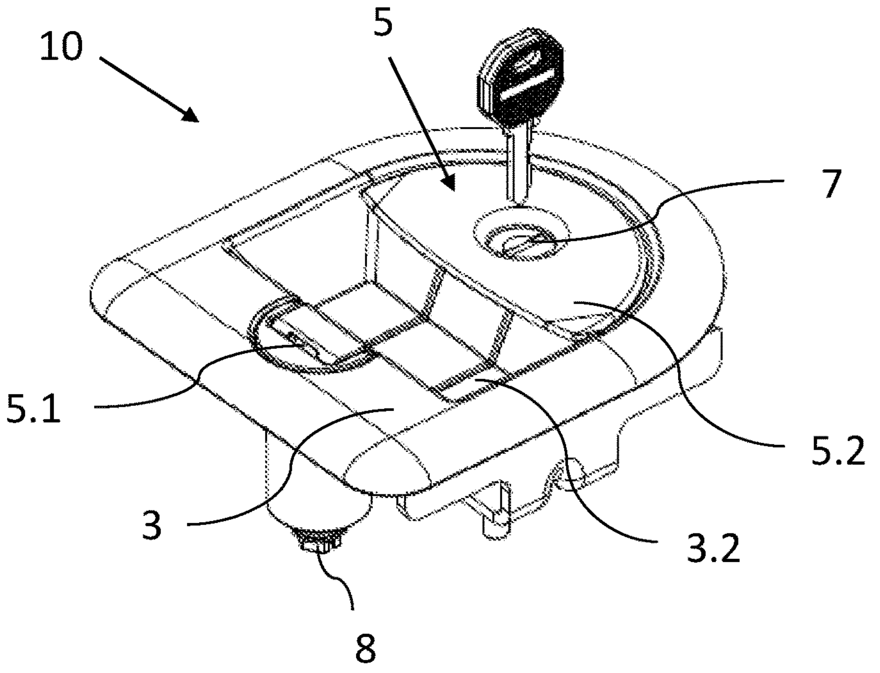
FIG. 2 shows a perspective view according to FIG. 1 with a key.
Figure 3A:
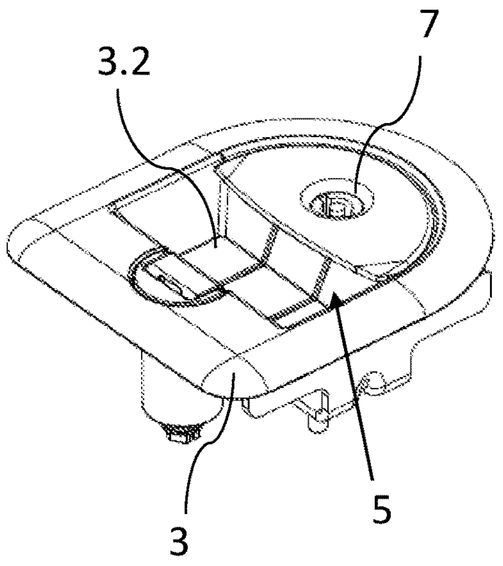
Figure 3B:
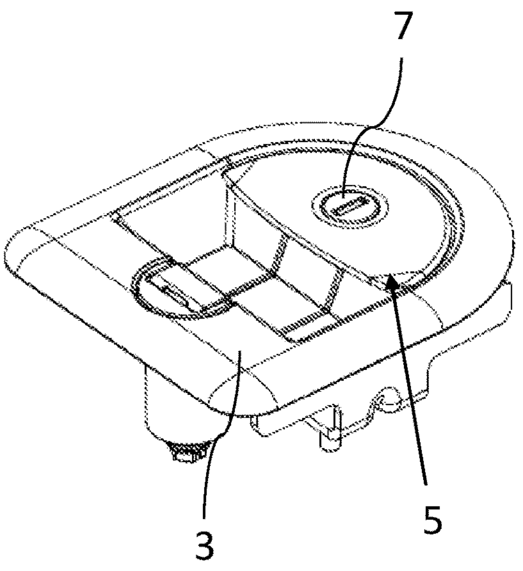
Figure 3C:
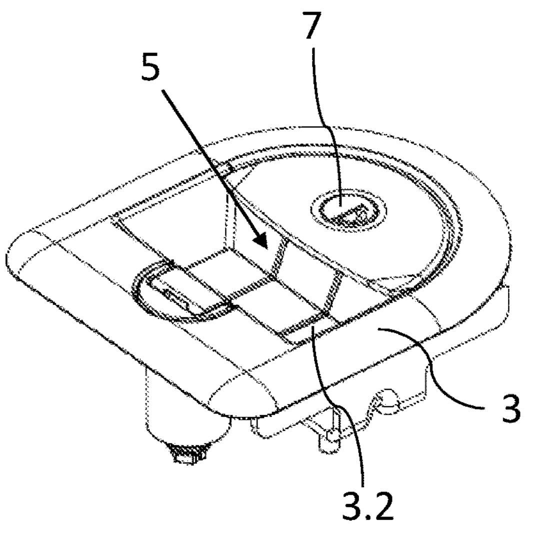
Figure 3D:
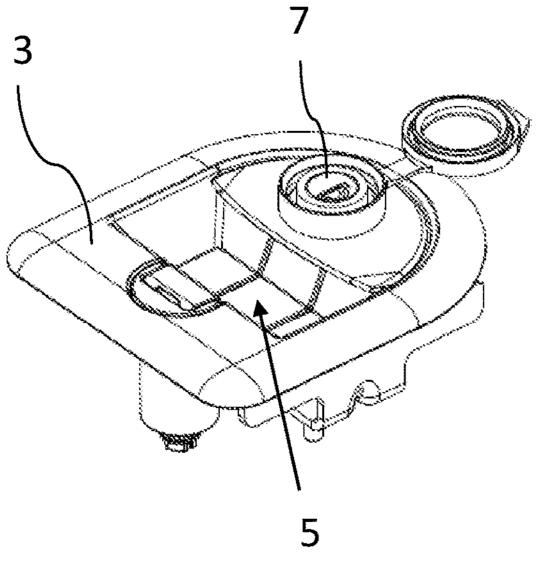
Figure 4A:
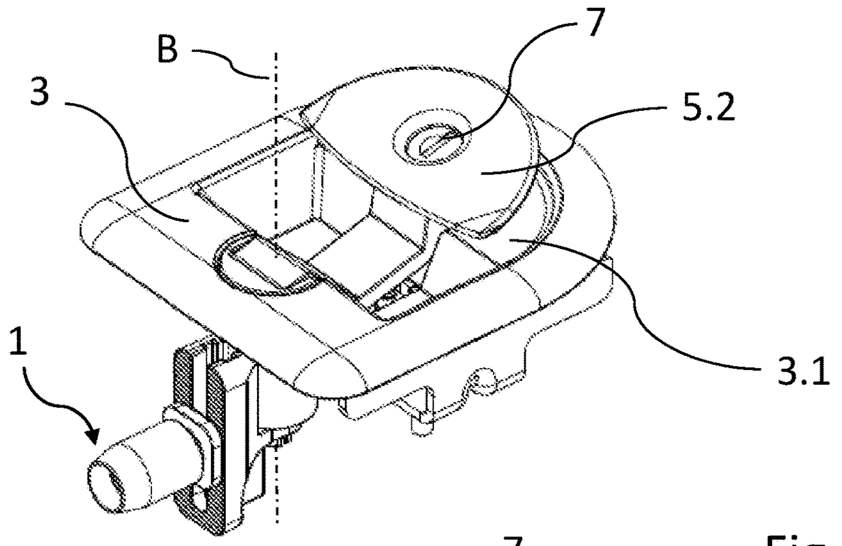
Figure 4B:
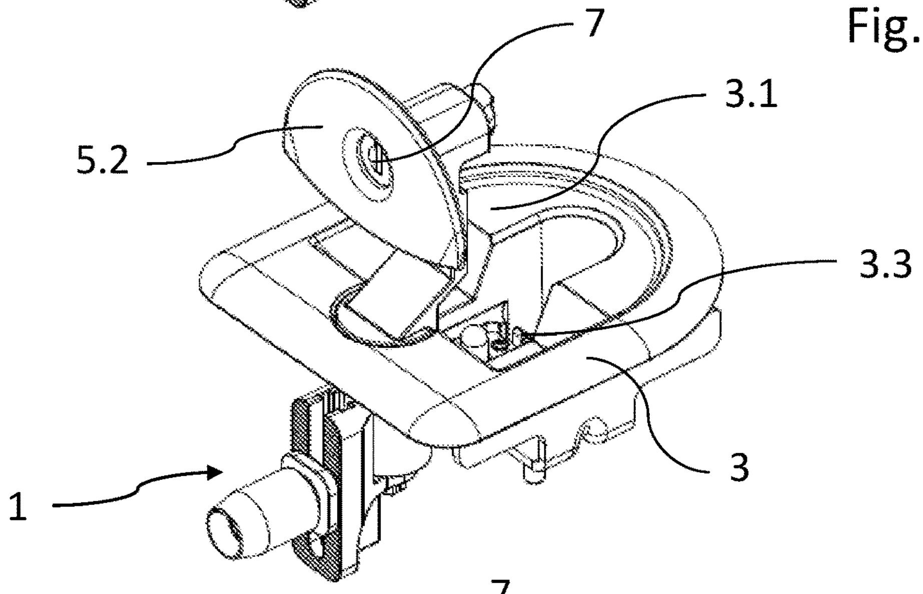
Figure 4C:
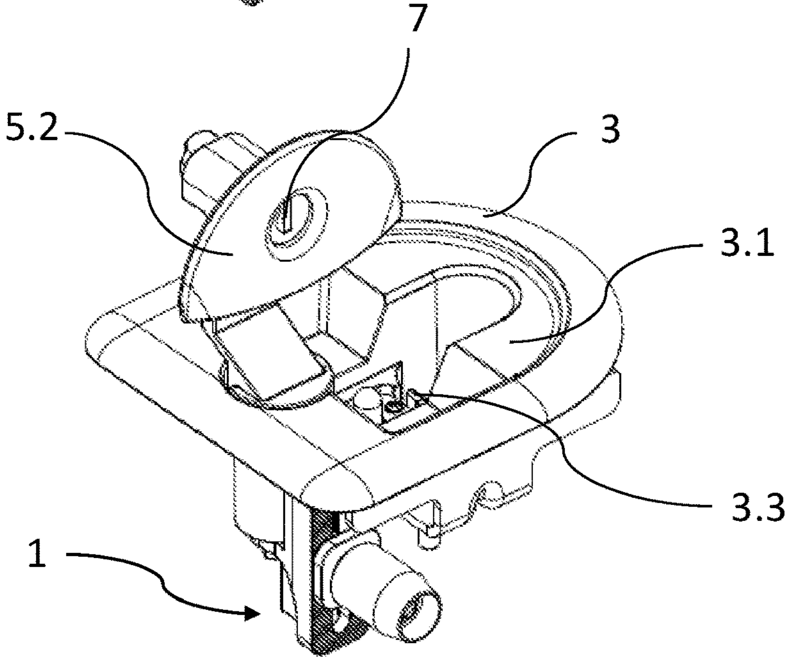
Figure 5A:
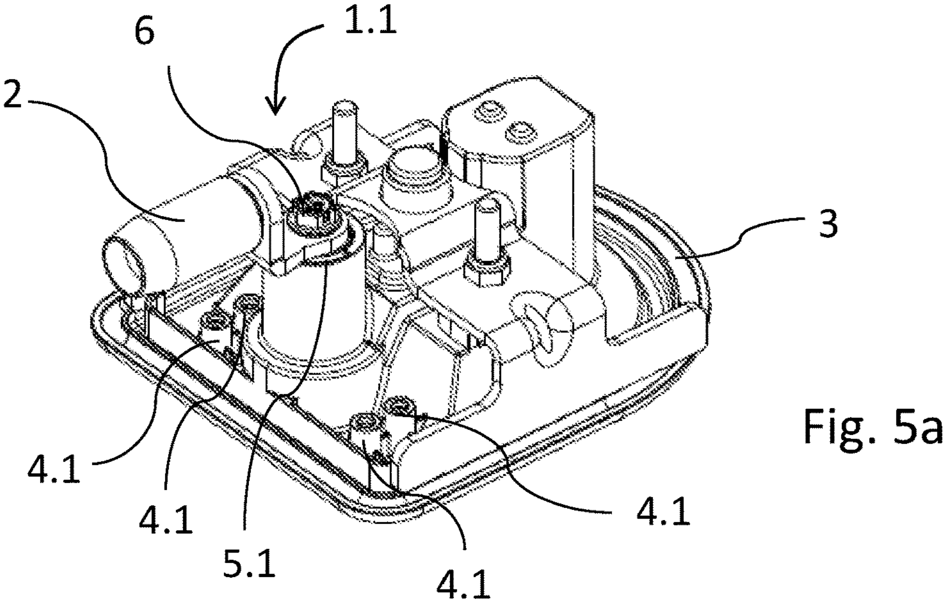
Figure 5B:
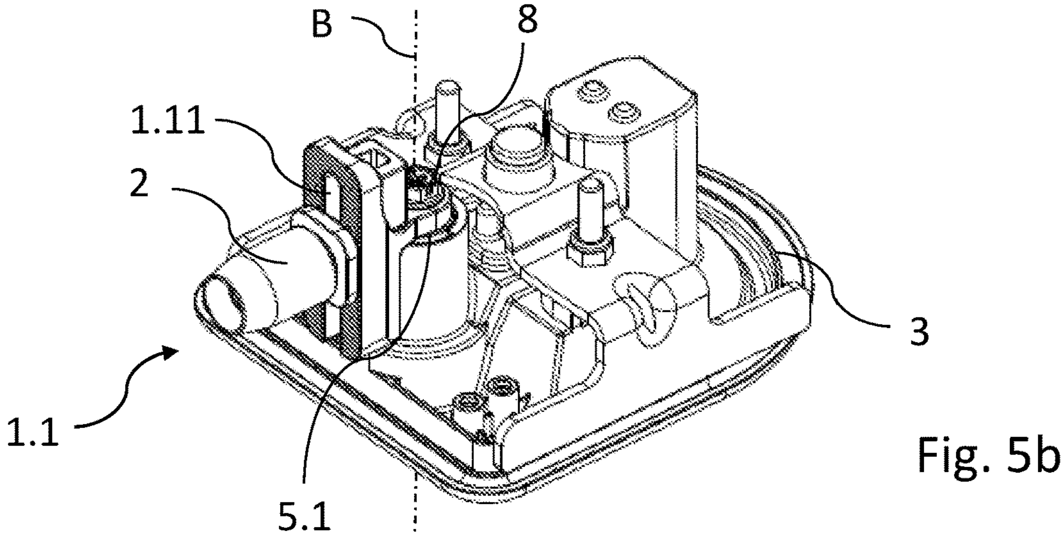
Figure 5C:
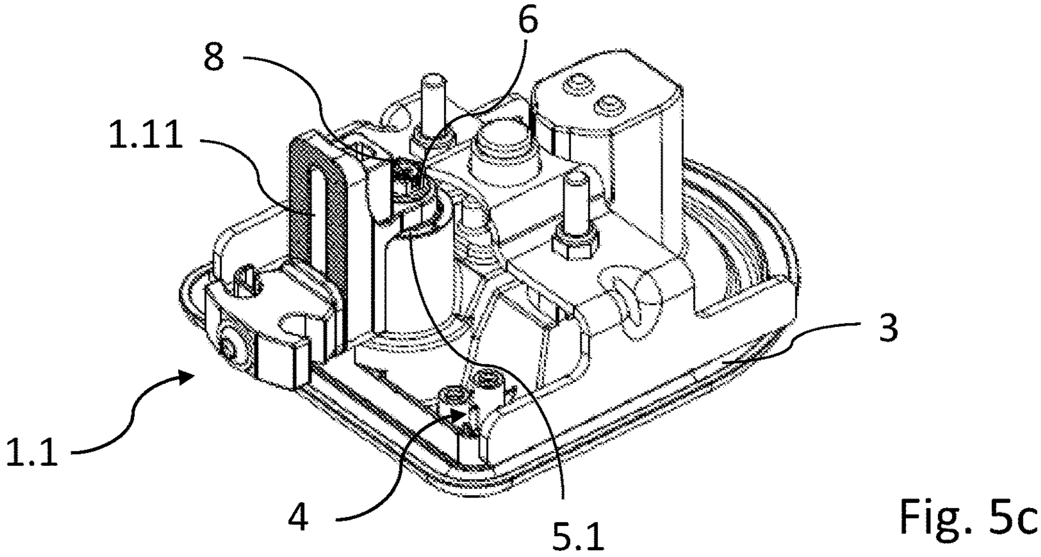
Figure 5D:
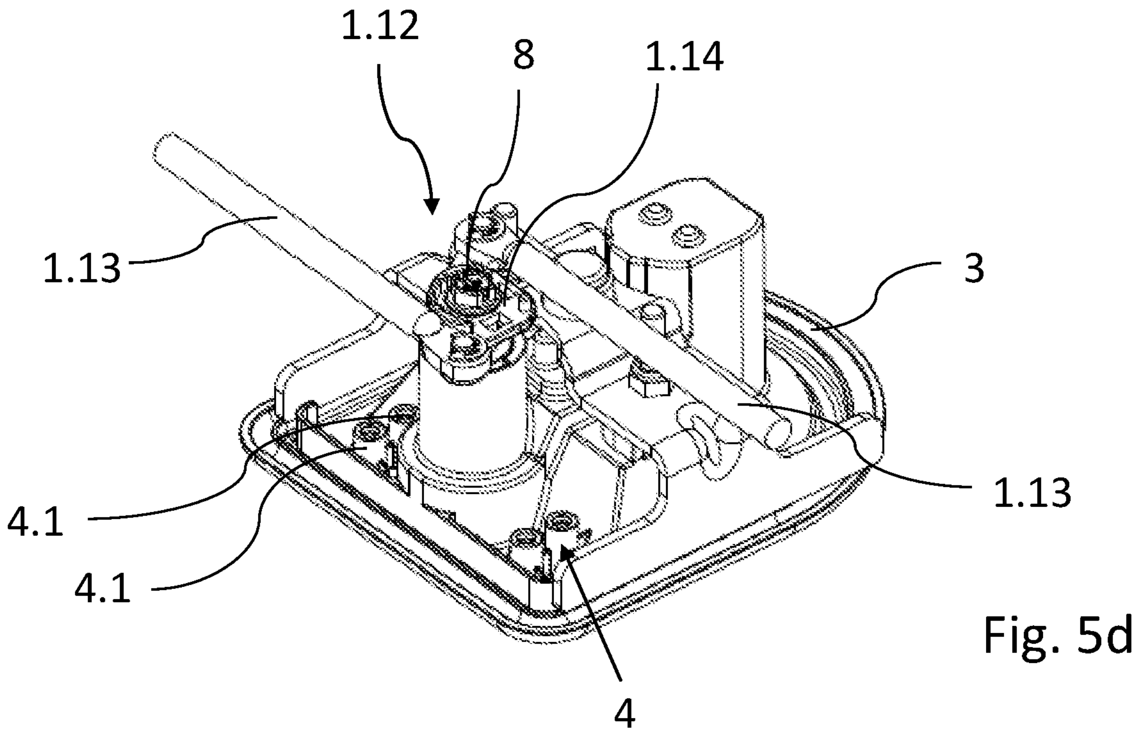
Figure 6:
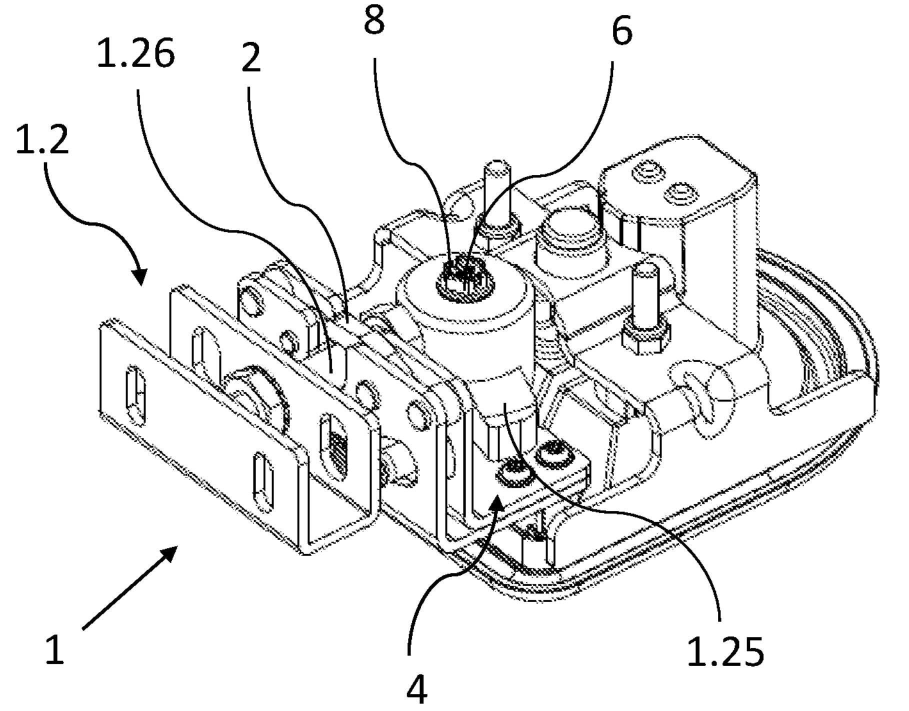
Figure 7A:
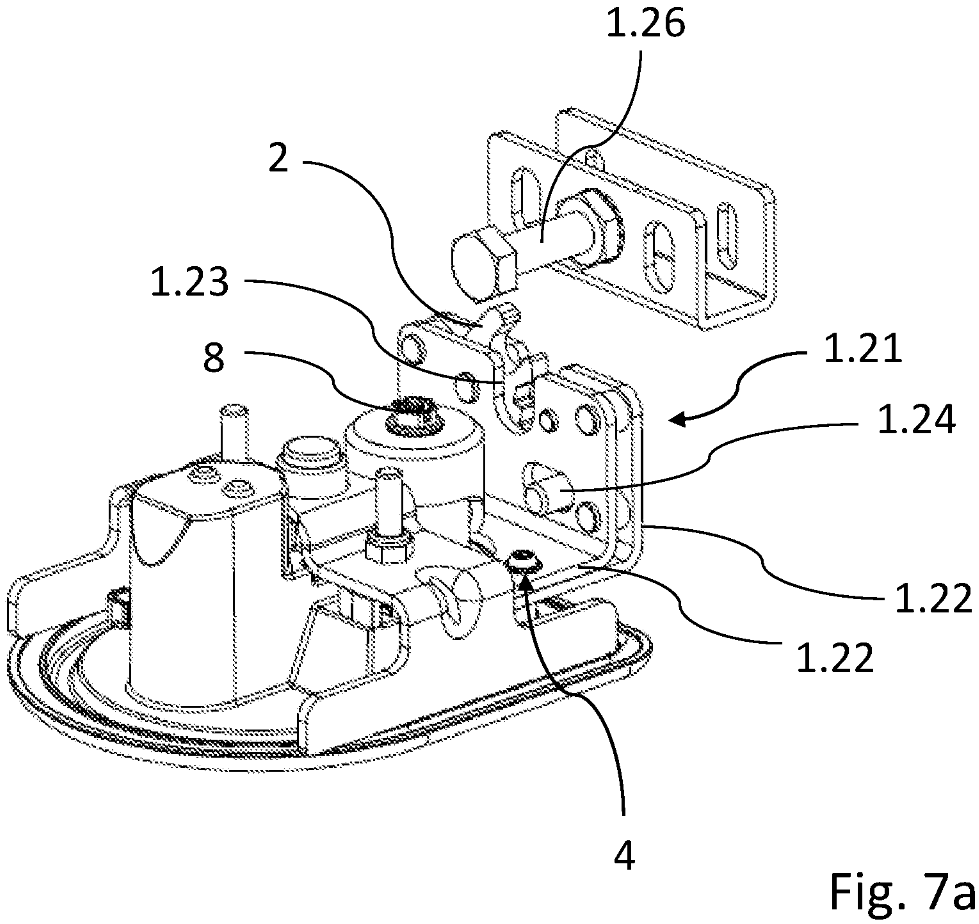
Figure 7B:
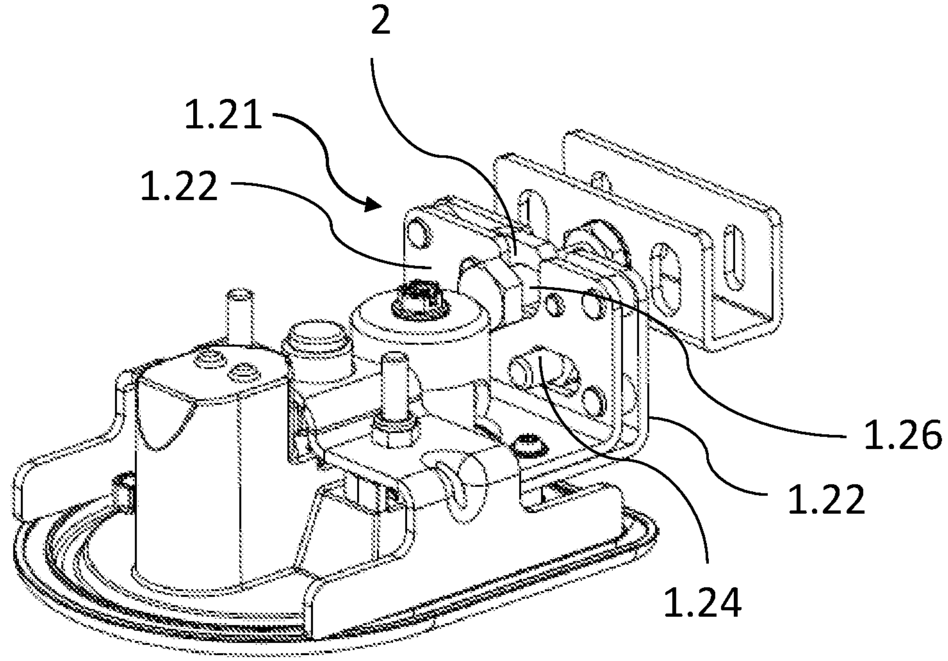

FIG. 3*a* shows a view according to FIG. 2 with a securing device;

FIG. 3*b* shows a view according to FIG. 2 with a differently configured securing device;

FIG. 3*c* shows a view according to FIG. 2 with a differently configured securing device;

FIG. 3*d* shows a view according to FIG. 2 with a differently configured securing device;

FIG. 4*a* shows a perspective views of a locking system with a casement-lock module in a position;

FIG. 4*b* shows a perspective view of a locking system with a casement-lock module in a different position;

FIG. 4*c* shows a perspective view of a locking system with a casement-lock module in a different position;

FIG. 5*a* shows a perspective view of a locking system with a casement-lock module;

FIG. 5*b* shows a perspective view of a locking system with a differently configured casement-lock module;

FIG. 5*c* shows a perspective view of a locking system with a differently configured casement-lock module;

FIG. 5*d* shows a perspective view of a locking system with a differently configured casement-lock module;

FIG. 6 shows a casement-lock system with a latch-lock module in a perspective view;

FIG. 7*a* shows a perspective view of a locking system with a latch-lock module; and FIG. 7*b* shows a perspective view of a locking system with a latch-lock module in a different position.

Figure 1:
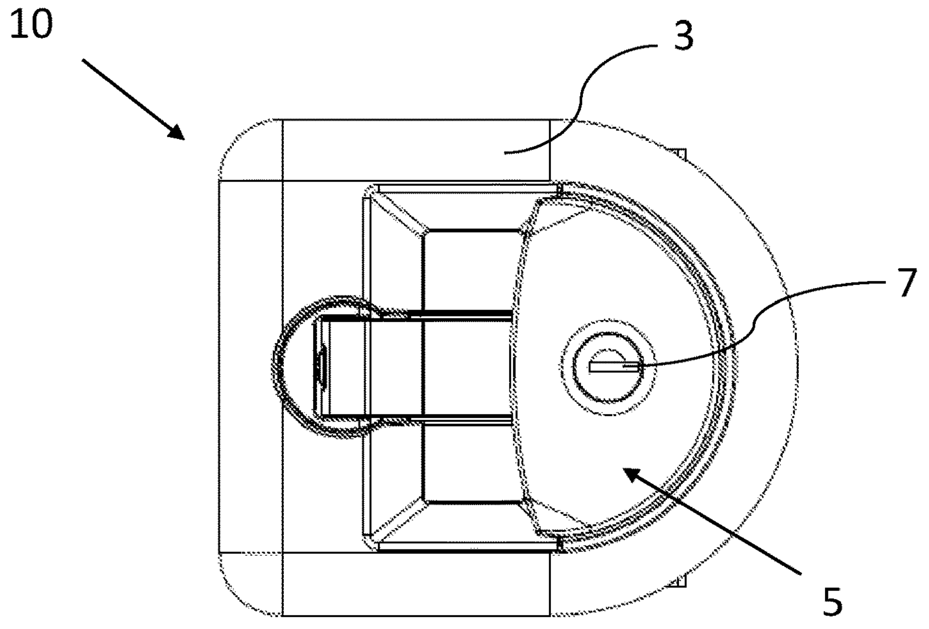
FIG. 1 shows a top view of a main body and an actuating element of a locking system.

In the illustration of FIG. 1, a main body 3 with an actuating element 5 is shown in a top view. The main body 3 is arranged on the outer side of a closure element which is configured as a door but which is not illustrated in the figures. The door can be secured in relation to the door frame in the closed position via the locking system 10, and therefore the door can no longer be opened. This will also be explained in more detail below with reference to FIGS. 4*a* to 4*c*.

In order to unlock the door or the locking system 10, the actuating element 5 has to be rotated about an actuating axis B. However, in the positions of the actuating element 5 that are shown in FIGS. 2 and 3*a* to 3*d*, the latter is located in the main body 3 in such a manner that a rotational movement of the actuating element 5 is not possible. In order to rotate the actuating element 5, the latter first of all has to be pivoted out of the main body 3, as can be seen in FIGS. 4*a* to 4*d*. The actuating element 3 substantially consists of two parts, namely of the grip region 5.2, which can be seen in FIGS.

1 to 4, and of an actuating shaft 5.1, which extends through the main body 3. The actuating shaft 5.1 is mounted rotatably in the main body and is connected at one end to the grip region 5.2 via a hinge connection. Owing to the pivotable connection between the grip region 5.2 and the actuating shaft 5.1, the grip region 5.2 can be pivoted in relation to the actuating shaft 5.1 and therefore also in relation to the main body 3, as can be seen in FIGS. 4*a* to 4*c*.

So that the grip region 5.2 can be pivoted out of the main body 3, the main body 3 has a recessed grip 3.2. The grip region 5.2 protrudes for a small distance above the recessed grip 3.2, and therefore it is possible to grip with one hand in the recessed grip 3.2 and behind the grip region 5.2 in order to pivot the grip region 5.2 out of the main body. In the pivoted-out position shown in FIG. 4*b*, the actuating element 5 can then be rotated since the main body 3 no longer grips around the grip region 5.2 and to this extent also no longer prevents the latter from a corresponding movement. Since, in order to rotate the actuating element 5, the latter has to be pivoted out of the main body 3, it is possible, by preventing this pivoting-out, also to prevent the door from being able to be correspondingly unlocked. In order to secure the grip region 5.2 in this respect in the main body 3, a securing device 7 in the manner of a lock is provided. Therefore, before the actuating element 5 can be pivoted out and rotated, the securing device 7 first of all has to be unlocked.

As can be seen in FIGS. 3*a* to 3*d*, the securing device 7 can comprise various types of lock. For example, FIGS. 3*b* and 3*c* show various plug-in cylinders which can be unlocked by keys, and FIG. 3*a* shows a securing device 7 which can be unlocked by a tool. In addition, a protective cap may also be provided, as can be seen in FIG. 3*d* and with which it is possible to prevent dirt from penetrating the closing cylinders of the securing devices 7.

Furthermore, the locking system 10 permits a push-to-lock function. For this purpose, the main body 3 has a spring-loaded catch hook 3.3 which, in the pivoted-in position of the grip region 5.2, engages in the latter. When the grip region 5.2 is pivoted in, the catch hook 3.3 automatically yields counter to the spring force and then, because of the spring force, also automatically engages again in the grip region 5.2 or in the securing device 7. A renewed pivoting-out of the grip region 5.2 is then possible only when the securing device 7 is unlocked. Since the catch hook 3.3 automatically yields when the grip region 5.2 is pivoted in, the grip region 5.2 can always be pivoted into the main body 3 independently of the position of the securing device 7, and is then first of all locked once.

The catch hook 3.3 is mounted in the main body 3 from the front side or outer side thereof, and therefore the main body 3 does not require any corresponding installation apertures. This can also be seen, for example, with reference to FIGS. 5*a* to 5*c*. This is because the rear side or inner side of the main body 3 does not have any apertures or openings, at least in the region in which the pivoted-in grip region 5.2 is arranged, but rather a closed rear side, and therefore to this extent no seals are required either.

As can furthermore be seen in FIGS. 4*a* to 4*b*, the main body 3 has an indicator surface 3.1 which is visible only when the grip region 5.2 has been pivoted out of the main body 3. This indicator surface 3.1 is colored in in a signal color and therefore is also readily visible from far away. In this respect, it can then be seen at first glance whether the grip region 5.2 has or has not been pivoted out and whether the door is reliably locked.

In order to lock a door via the locking system 10, the rear side of the main body 3 is provided with a locking module 1 with a locking element 2 which is rotatable to and from between a locking position and an unlocking position via the actuating element 5. The locking position is shown in FIG. 4*a*. In said locking position, the locking element 2 of the locking module can reach into or behind the door frame and can thereby secure the door in relation to the door frame. In order to open the door, the locking element 2 then firstly has to be transferred into the unlocking position illustrated in FIG. 4*c*. For a corresponding actuation, the locking module 1 is coupled to the actuating element 5 such that, by means of the rotational movement of the actuating element 5 or of the grip region 5.2, the locking module 1 can be transferred into the locking position or into the unlocking position.

As can be seen in FIG. 4*c*, the locking element 2 in this unlocking position is rotated by approx. 90 degrees in relation to the locking position, and therefore the locking element 2 in this position no longer engages in or behind the door frame and the door can then to this extent be opened. In order to connect the locking module 1 to the actuating element 5, an interface 6 which, upon actuation, rotates together with the actuating element 5, is arranged at the lower end of the actuating shaft 5.1. The locking module 1 can be connected to the actuating element 5 for rotation therewith via said interface 6, and therefore, in the event of an actuation, the locking element also rotates about the actuating axis B. For the connection, use can be made of a connecting element 8 in the form of a screw, via which the locking module 1 can then be releasably connected to the actuating element 5, as is also apparent, for example, in FIG. 5*a* which shows the lower side of the locking system 10.

Furthermore, in addition to the interface 6 which is rotatable together with the actuating element 5, yet another interface 4 is also provided which serves to connect the locking module 1 to the main body 3. However, in contrast to the interface 6, the interface 4 is fixed. In the case of the locking module 1 shown in FIGS. 5*a* to 5*d*, this interface 4, however, is not populated since this type of locking module requires just one connection to the actuating element 5. Other types of locking module, such as the latch-lock module 1.2 illustrated in FIG. 6, require, however, not only a connection to the actuating element 5, but furthermore yet another interface, which is fixed nonrotatably, for connection to the main body 3. The locking system 10 can therefore be used both with locking modules 1 which require just the interface 6, and with those which, in addition to the interface 6, also require the interface 4. First of all, differently configured locking modules 1 which can be assigned to the first type of locking module and which are all configured in the manner of a casement-lock module 1.1, will now be described below with reference to FIGS. 5*a* to 5*d* before, subsequently, the second type of locking module that is illustrated in FIGS. 6 and 7*a*, 7*b* will then be discussed in more detail.

The casement-lock module 1.1 according to FIG. 5*a* has a locking element 2 which is configured as a roller tongue and is directly connected to the interface 6 and/or to the actuating element 5. When the actuating element 5 is rotated, the locking element 2 correspondingly also rotates to and from, as has already been described above with regard to FIGS. 4*a* to 4*c*. The roller tongue can freely rotate about its longitudinal axis, which facilitates shutting of the door since the roller can run on or at the door frame. In addition, a certain degree of compression of the door seal can also be achieved via the roller tongue.

In the configuration which is illustrated in FIG. 5*b*, the roller tongue is connected to the actuating element 5 via a guide 1.11. The roller tongue can therefore be moved in the direction of the actuating axis and therefore perpendicularly to the door, as a result of which the roller tongue can be adapted to different geometrical dimensions of the door or the door frame. The locking module of FIG. 5*c* likewise has the guide which is illustrated in FIG. 5*b*. However, the locking element 2 in this locking module 1 is configured as a hook tongue.

The locking module 1 shown in FIG. 5*d* is likewise a casement-lock module 1.1, but the actual casement-lock tongues are not also illustrated. Instead, a rod drive 1.12 is shown via which the actuating element 5 can also be connected to a plurality of casement-lock tongues. For this purpose, the rod drive 1.12 has two rods 1.13 which extend in different directions and via which a respective casement-lock tongue can be driven. To this extent, this locking module 1 provides multi-point locking for the door. The rod drive 1.12 furthermore has a coupling element 1.14 which is connected via the interface 6 to the actuating element 5 and which ensures that the rotational movement of the actuating element 5 is converted into a substantially linear movement of the two rods 1.13.

FIG. 6 illustrates a different type of locking module 1, namely a latch-lock module 1.2. In contrast to the casement-lock module 1.1, the latch-lock module 1.2 not only requires a rotatable interface 6 for connection to the actuating element, but in addition also a fixed interface 4 for connection to the main body 3. The corresponding interface 4 has a total of four individual points of connection 4.1 which are each arranged in pairs next to the actuating shaft 5.2 on the lower side of the main body 3. Unlike the casement-lock module 1.1, the latch-lock module 1.2 is configured in two parts and consists essentially of a frame 1.21 and a driver 1.25. The driver 1.25 functions basically in a similar manner to the locking element 2 of the casement-lock modules. This is because it is likewise connected to the rotatable interface 6 and can thus be rotated to and from via the actuating element 5. The driver 1.25 is arranged here on a union sleeve which is connected in the upper region to the actuating shaft 5.1 and which is adjoined at the lower end by the driver 1.25 perpendicularly to the actuating axis B, as can be seen in FIG. 6.

The second part of the latch-lock module 1.2 is configured as a frame 1.21 and connected to the main body 3 via the fixed interface 4. The frame 1.21 has two frame plates 1.22 which each consist of two frame limbs, namely a fastening limb and a bearing limb, which are arranged at 90 degrees to each other. The fastening limbs lie directly one on the other and are connected to the four points of connection 4.1 of the interfaces 4 via screws. The bearing limbs, which are arranged perpendicularly to the fastening limbs, are at a certain distance from one another and a locking element 2 configured as a rotary latch is arranged rotatably between them. The rotary latch together with the two frame limbs 1.22 or the two bearing limbs can accommodate a bolt 1.26 in a form-fitting manner, and therefore the bolt 1.26 then at least can no longer be moved in a translational manner. In this position, the door then can no longer be moved in relation to the door frame either.

To accommodate and secure the bolt, the rotary latch has a U-shaped receiving region and the bearing limbs have a locking groove 1.12. When the door is closed, the bolt 1.26 enters the locking groove 1.12 and at the same time also the rotary latch. The rotary latch is pivoted in the process and rotated into the locked position, as is apparent in FIGS. 7*a* and 7*b*. The locking element 2 is pretensioned via a spring element into the unlocking position, and therefore, when the door is closed, the bolt 1.26 is moved counter to the force of the spring and said bolt presses the locking element 2 into the locking position. In the locking position, the rotary latch is firmly held by an arresting pin 1.24 and prevented from rotating back into the unlocking position. The door is therefore automatically locked upon closing when the locking element has reached the locking position.

To open the door, the rotary latch has to be rotated back into the unlocking position. Since the rotary latch is pretensioned into the unlocking position, this takes place automatically if the arresting pin 1.24 no longer fixes the rotary latch in the locking position. The rotary latch then springs back into the unlocking position and the door can be opened again.

In order to correspondingly move the arresting pin 1.24, the actuating element 5 has to be rotated about the actuating axis B, precisely as has already been described above with regard to the casement-lock module 1.1. During this movement, the driver 1.25 comes into contact with the arresting pin 1.24 and correspondingly carries the latter along with it. Owing to the corresponding movement of the arresting pin 1.24, the rotary latch is then released and snaps up because of the spring pretensioning. A renewed movement of the rotary latch into the locking position is not possible by the driver 1.25 or by rotation of the actuating element 5. Unlike in the case of the casement-lock module 1.1, in the case of the latch-lock module 1.2 the locking element 2 has to be transferred into the locking position by means of the closing movement of the door or by means of the corresponding movement of the bolt 1.26. By rotation of the actuating element 5, the locking element 2 therefore can just be unlocked, but not locked.

REFERENCE SIGNS

1 Locking module
1.1 Casement-lock module
1.11 Guide
1.12 Rod drive
1.13 Rod
1.14 Coupling element
1.2 Latch-lock module
1.21 Frame
1.22 Frame plates
1.23 Locking groove
1.24 Arresting pin
1.25 Driver
1.26 Bolt
2 Locking element
3 Main body
3.1 Indicator surface
3.2 Recessed grip
3.3 Catch hook
4 Interface
4.1 Point of connection
5 Actuating element
5.1 Actuating shaft
5.2 Grip region
6 Interface
7 Securing device
8 Connecting element
10 Locking system
B Actuating axis Having described the invention in detail and by reference to the various embodiments, it should be understood that modifications and variations thereof are possible without departing from the scope of the claims of the present application.

What is claimed is:

1. A locking system for locking a closure element having a main body, which accommodates an actuating element in a rotatable manner and is configured to be positioned on one side of the closure element, the locking system including a locking module, which is configured to be positioned on the opposite side of the closure element, wherein the actuating element has a rotatable interface for rotatable connection to the locking module, wherein the main body has a fixed interface for connection to the locking module, wherein the locking system is configured for use in a first mode and a second mode, wherein when the locking system is in the first mode the locking module is operatively connected to the rotatable interface such that at least part of the locking module is rotatable relative to the main body and the locking module is not operatively connected to the fixed interface, and when the locking system is in the second mode the locking module is operatively connected to both the rotatable interface and the fixed interface such that at least part of the locking module is rotatable relative to the main body, and at least part of the locking module is fixedly coupled to the main body.

2. The locking system according to claim 1, including at least one of a first type of locking module or a second type of locking module, wherein the first type of locking module is a casement-lock module and the second type of locking module is a latch-lock module.

3. The locking system according to claim 2, wherein the casement-lock module is configured to be connected in one case to the rotatable interface and not to the fixed interface, and wherein the latch-lock module is configured in another case to be connected both to the rotatable interface and to the fixed interface.

4. The locking system according to claim 2, wherein the casement-lock module has a locking element configured in the form of a casement-lock tongue, wherein the casement-lock tongue is configured in the form of a roller tongue or of a hook tongue.

5. The locking system according to claim 2, wherein the latch-lock module has a frame, which is connected to the fixed interface, and a locking element, which is arranged in a movable manner in relation to the frame, wherein the locking element is secured in the locking position via an arresting pin.

6. The locking system according to claim 5, wherein the latch-lock module has a driver, which is coupled to the actuating element and is intended for unlocking the locking element, wherein, in a first angle range, the actuating element can be rotated freely together with the driver and wherein, in a second angle range, the arresting pin can be moved via the driver.

7. The locking system according to claim 1, wherein in dependence on the type of locking module, the fixed interface is used or remains unused.

8. The locking system according to claim 1, wherein the rotatable interface and the fixed interface are both are configured in the form of mechanical interfaces.

9. The locking system according to claim 1, wherein the fixed interface has a plurality of points of connection, and the points of connection of the main body are configured in the form of domes.

10. The locking system according to claim 1, wherein the actuating element has an actuating shaft, which extends through the main body, wherein the rotatable interface is arranged at the end of the actuating shaft, wherein the actuating element has a grip region, which is connected in a pivotable manner to the actuating shaft, wherein the grip region can be pivoted out of the main body and pivoted into the main body, and wherein, in the pivoted-out position, the actuating element is rotatable and, in a pivoted-in position, is not rotatable.

11. The locking system according to claim 10, wherein the grip region is secured in the pivoted-in position via a securing device such that the grip region cannot be transferred into the pivoted-out position.

12. The locking system according to claim 10, wherein the main body has an indicator surface, which is visible when the grip region has been pivoted out and is not visible when the grip region has been pivoted in.

13. The locking system according to claim 1, including a plurality of locking modules of different types.

14. A closure element having a locking system according to claim 1.

15. The locking system according to claim 1, wherein the actuating element is rotatable relative to the main body when the locking system is in the second mode.

16. The locking system according to claim 1, where the fixed interface is positioned on the main body.

17. A method for installing a locking system comprising:

providing a locking system for locking a closure element having a main body, which accommodates an actuating element in a rotatable manner and is intended to be arranged on one side of the closure element, and a locking module, which is intended to be arranged on the opposite side of the closure element, wherein the actuating element has a rotatable interface for rotatable connection to the locking module, wherein the main body has a fixed interface for connection to the locking module and wherein the locking system is configured for use in a first mode and a second mode, wherein when the locking system is in the first mode the locking module is operatively connected to the rotatable interface such that at least part of the locking module is rotatable relative to the main body and the locking module is not operatively connected to the fixed interface, and when the locking system is in the second mode the locking module is operatively connected to both the rotatable interface and the fixed interface such that at least part of the locking module is rotatable relative to the main body, and at least part of the locking module is fixedly coupled to the main body; and coupling the locking system to the closure element.

* * * * *